(12) United States Patent
Kuehn

(10) Patent No.: US 10,059,534 B2
(45) Date of Patent: Aug. 28, 2018

(54) FEED HOSE FOR FEEDING CONNECTING ELEMENTS TO A PROCESSING UNIT

(71) Applicant: LEONI KABEL HOLDING GMBH, Nuremberg (DE)

(72) Inventor: Hans-Peter Kuehn, Floh-Seligenthal (DE)

(73) Assignee: LEONI Kabel Holding GmbH, Nuremberg (DE)

( * ) Notice: Subject to any disclaimer, the term of this patent is extended or adjusted under 35 U.S.C. 154(b) by 0 days.

(21) Appl. No.: 14/945,707

(22) Filed: Nov. 19, 2015

(65) Prior Publication Data

US 2016/0075524 A1    Mar. 17, 2016

Related U.S. Application Data

(60) Division of application No. 13/980,372, filed on Sep. 20, 2013, now Pat. No. 9,238,556, which is a
(Continued)

(30) Foreign Application Priority Data

Jan. 18, 2011 (DE) .................. 10 2011 008 845

(51) Int. Cl.
| | |
|---|---|
| *B65G 53/54* | (2006.01) |
| *B65G 51/02* | (2006.01) |
| *B21J 15/32* | (2006.01) |
| *B23P 19/00* | (2006.01) |
| *B25J 19/00* | (2006.01) |
| *F16L 11/12* | (2006.01) |
| *B21J 15/30* | (2006.01) |

(52) U.S. Cl.
CPC .............. *B65G 51/02* (2013.01); *B21J 15/30* (2013.01); *B21J 15/32* (2013.01); *B23P 19/005* (2013.01); *B25J 19/00* (2013.01); *B25J 19/0025* (2013.01); *F16L 11/121* (2013.01)

(58) Field of Classification Search
CPC .......... F16L 11/121; B65G 53/54; B21J 15/32
USPC ............... 406/191, 196; 414/222.01, 222.04, 414/222.08; 227/112; 901/7; 29/525.06
See application file for complete search history.

(56) References Cited

U.S. PATENT DOCUMENTS

| | | |
|---|---|---|
| 380,645 A | 4/1888 | Dean |
| 1,020,460 A | 3/1912 | Smith |
| | (Continued) | |

FOREIGN PATENT DOCUMENTS

| | | |
|---|---|---|
| CN | 201129561 Y | 10/2008 |
| DE | 2950704 A1 | 6/1981 |
| | (Continued) | |

*Primary Examiner* — Joseph Dillon, Jr.
(74) *Attorney, Agent, or Firm* — Laurence A. Greenberg; Werner H. Stemer; Ralph E. Locher

(57) ABSTRACT

In order to ensure a reliable automated feed of connecting elements to a processing unit, an apparatus, in particular an industrial robot, is provided. The apparatus has a hose pack, in which a feed hose for connecting elements is contained as a supply line. In order to ensure reliable operation and kink protection of the feed hose, the latter is formed from an inner hose which is embedded in a over-molded hose jacket. This measure permits the integration of the feed hose into the hose pack without problems. In addition, the risk of the feed hose kinking is kept small.

10 Claims, 2 Drawing Sheets

Related U.S. Application Data continuation of application No. PCT/EP2012/050657, filed on Jan. 17, 2012.

(56) References Cited

U.S. PATENT DOCUMENTS

| | | | |
|---|---|---|---|
| 2,471,209 A | 4/1944 | Gazdik | |
| 3,812,933 A | 5/1974 | Wanner et al. | |
| 3,890,360 A | 6/1975 | Gordon | |
| 4,186,778 A * | 2/1980 | Carey | B29D 23/001 138/103 |
| 4,336,872 A * | 6/1982 | Noda | B29C 53/086 138/DIG. 11 |
| 4,474,217 A | 10/1984 | DeMarse et al. | |
| 4,577,536 A | 3/1986 | Lechot et al. | |
| 4,628,779 A * | 12/1986 | Louis | B23B 13/02 414/14 |
| 4,729,270 A * | 3/1988 | Pritchard | B25B 13/00 81/177.5 |
| 4,832,537 A * | 5/1989 | Roberts | B29C 65/76 156/256 |
| 4,945,625 A * | 8/1990 | Winston | F16B 3/005 156/92 |
| 5,052,444 A * | 10/1991 | Messerly | F16L 11/088 138/103 |
| 5,058,466 A * | 10/1991 | Fabbri | B23B 13/02 29/41 |
| 5,349,988 A * | 9/1994 | Walsh | F16L 33/2075 138/109 |
| 5,669,420 A * | 9/1997 | Herrero | B21C 37/121 138/122 |
| 6,376,036 B1 * | 4/2002 | Nadkarni | B32B 25/08 138/125 |
| 6,770,349 B2 * | 8/2004 | Itoh | B29C 73/04 29/402.01 |
| 6,951,298 B1 * | 10/2005 | Cogley | B21J 15/32 227/112 |
| 6,986,450 B2 | 1/2006 | Matthews et al. | |
| 7,022,133 B2 * | 4/2006 | Yee | A61F 2/95 606/108 |
| 8,533,922 B2 | 9/2013 | Hain et al. | |
| 8,936,046 B2 * | 1/2015 | Ragner | F16L 11/118 138/118 |
| 9,440,363 B2 * | 9/2016 | Okahisa | B25J 18/04 |
| 9,764,483 B2 * | 9/2017 | Okahisa | B25J 18/00 |
| 2002/0185188 A1 * | 12/2002 | Quigley | B32B 1/08 138/137 |
| 2003/0199916 A1 * | 10/2003 | Yee | A61F 2/95 606/198 |
| 2004/0217144 A1 | 11/2004 | Matthews et al. | |
| 2005/0087248 A1 * | 4/2005 | Nobileau | F16L 11/121 138/114 |
| 2006/0193698 A1 * | 8/2006 | Mjelstad | D07B 1/12 405/195.1 |
| 2008/0202691 A1 | 8/2008 | Hamlyn et al. | |
| 2009/0003781 A1 * | 1/2009 | Parris | G02B 6/4429 385/113 |
| 2009/0142169 A1 | 6/2009 | Garcia et al. | |
| 2009/0218325 A1 * | 9/2009 | Kreischer | A61M 39/146 219/121.63 |
| 2010/0101676 A1 * | 4/2010 | Quigley | B32B 1/08 138/137 |
| 2011/0146456 A1 | 6/2011 | Hain et al. | |
| 2011/0272126 A1 * | 11/2011 | Hamlyn | B29C 70/382 165/177 |
| 2013/0125608 A1 * | 5/2013 | Meiners | B21D 9/00 72/370.05 |
| 2014/0079494 A1 | 3/2014 | Hain et al. | |
| 2014/0105694 A1 | 4/2014 | Nettesheim | |
| 2014/0178019 A1 * | 6/2014 | Sakabe | G02B 6/443 385/101 |
| 2014/0230946 A1 * | 8/2014 | Procida | F16L 59/153 138/129 |
| 2014/0261841 A1 * | 9/2014 | Orow | B29D 23/001 138/118 |
| 2014/0261844 A1 * | 9/2014 | Orow | F16L 57/02 138/137 |
| 2014/0360306 A1 | 12/2014 | Mihara et al. | |
| 2015/0050441 A1 * | 2/2015 | Troi | B29C 70/542 428/36.4 |
| 2015/0252920 A1 * | 9/2015 | Farnes | F16L 11/083 138/135 |
| 2016/0123505 A1 * | 5/2016 | Damiens | F16L 11/083 138/133 |
| 2016/0131019 A1 * | 5/2016 | Sakai | F01P 7/14 138/118 |
| 2016/0199085 A1 * | 7/2016 | Hong | A61B 17/0057 604/500 |

FOREIGN PATENT DOCUMENTS

| | | |
|---|---|---|
| DE | 29507041 U1 | 8/1995 |
| DE | 102004034349 A1 | 2/2006 |
| DE | 102007008882 A1 | 8/2008 |
| EP | 0037358 A1 | 10/1981 |
| EP | 2258508 A1 | 12/2010 |
| GB | 2300183 A | 10/1996 |
| JP | S5497988 U | 7/1979 |
| JP | S62145526 U | 9/1987 |
| JP | S63115758 U | 7/1988 |
| JP | 2002079346 A | 3/2002 |
| JP | 2002086314 A | 3/2002 |
| JP | 2004203605 A | 7/2004 |
| JP | 2004330447 A | 11/2004 |
| JP | 2009243496 A | 10/2009 |
| JP | 2009280393 A | 12/2009 |
| KR | 10-20010061741 A | 7/2001 |
| KR | 10-20090127297 A | 12/2009 |
| WO | 2004076133 A1 | 9/2004 |

* cited by examiner

FEED HOSE FOR FEEDING CONNECTING ELEMENTS TO A PROCESSING UNIT

CROSS-REFERENCE TO RELATED APPLICATION

This application is a divisional of copending patent application Ser. No. 13/980,372, filed Sep. 20, 2013, which was a § 371 national stage of international patent application No. PCT/EP2012/050657, filed on Jan. 17, 2012; the application also claims the priority, under 35 U.S.C. § 119, of German patent application No. DE 10 2011 008 845.8, filed Jan. 18, 2011; the prior applications are herewith incorporated by reference in their entirety.

BACKGROUND OF THE INVENTION

Field of the Invention

The invention relates to an apparatus for the automated feed of connecting elements such as, for example, bolts, rivets, screws, nuts, etc. to a processing unit such as, for example, a welding head, a riveting unit, a screwing unit, etc. The invention further relates to a feed hose for the connecting elements.

In industrial production technology, for example in the automotive industry, (sheet metal) joining components are connected to one another by means of automated processing units in an automated process by, for example, welding, screwing, riveting, etc., or the joining components are provided with such connecting elements such as, for example, welding studs, etc.

The individual connecting elements here are usually fed to the processing unit via feed hoses, for example delivered into the processing unit by compressed air. The feed hoses here are in some cases more than several 10 m long.

In order not to interrupt the industrial production process, a frictionless feeding of the connecting elements is required. The feed hoses usually consist of a plastic material with a suitable low-friction inner surface in order to permit the delivery of the connecting elements. The feed hoses are made, for example, from polyamide of a comparatively high hardness. Because of this requirement, the feed hoses often have only an insufficient bending flexibility such that the risk of kinking of the feed hose exists in the event of bending stress. On account of the comparatively hard plastic material, kinking results in irreversible kinks which permanently interrupt the feed of the connecting elements. Usually, a replacement of the entire feed hose is necessary. This is comparatively time-consuming and leads to undesirable losses in production.

Particularly given the increasing use of multi-axis industrial robots, for example 3-axis to 6-axis industrial robots, which usually have a robot arm rotatably mounted on a swing arm, a robotic hand supporting the processing unit being located on the free end of said robot arm, high requirements are set for the feed lines in particular with respect to flexibility.

In present solutions, the feed hoses for the connecting elements are separately laid beside a robot hose pack. The additionally required supply lines, for example fluid or electrical lines for supplying the processing unit, are laid in such a robot hose pack. Such hose packs are line arrangements which are adapted to the motion sequence of the multi-axis industrial robot and in which a plurality of supply lines are laid in a common hose or pipe. Provision is usually made of a complete line arrangement unit, which handles the length compensation of the hose pack required by the movement of the robotic hand, for example by spring units etc.

BRIEF SUMMARY OF THE INVENTION

Proceeding from here, the invention is based on the object of enabling an improved feed of such connecting elements to processing units, in particular in the case of industrial robots.

The object is achieved according to the invention by an apparatus for the automatic feed of connecting elements to a processing unit having the features as claimed. The object is achieved furthermore according to the invention by a feed hose for connecting elements having the features as claimed.

The apparatus is in particular a multi-axis industrial robot. The apparatus comprises what is referred to as a hose pack, in which a plurality of supply lines for supplying the processing unit with production means are laid inside a protective casing. The protective casing is, for example, a corrugated tube or also any other flexible tube or a hose made from a suitable plastic, in which the supply lines are drawn-in. As a further supply conduit, the hose pack comprises a flexible feed hose for feeding the connecting elements to the processing unit. The feed hose here is formed by an inner hose which is embedded in a hose casing made from an elastic plastic. The inner hose here is suitably designed for guiding the connecting elements, for example for a delivery of the connecting elements to the processing unit by means of compressed air. For this purpose, the inner hose has an interior cross section which is adapted to the cross-sectional elements and a suitable low-friction surface for a gliding guidance of the connecting elements.

Embedded in this context means that the hose casing lies tight against the inner hose and completely surrounds said inner hose. By embedding the inner hose in a hose casing of an elastic plastic, the inner hose is virtually embedded within the feed hose in the manner of a neutral fiber. On account of this special two-part design, a sufficient kink protection is achieved even under high bending stress. In the event of bending of the feed hose, substantially only the hose casing is therefore subjected to tensile loading or compression, and the risk of kinking of the usually comparatively hard inner hose is reduced. A continuous trouble-free operation of the entire apparatus is thereby ensured. By embedding the, for example, T-shaped inner hose in a preferably circular hose casing, the feed hose is moreover manageable in an easy and robust manner, comparable to a cable, and is therefore suited to integration as a supply line into the hose pack.

The wall thickness of the hose casing here is typically in the range of a few millimeters, for example in the range of 2 to 5 mm. The feed hose of two-part design is preferably a continuous product. The hose casing is preferably applied to the inner hose by an extrusion process.

Generally, different materials are used for the two components, i.e. inner hose and hose casing, such that the two components are unconnected to one another by integral bonding even in the event of an extrusion process. This configuration makes it possible, on the one hand, to simply partially remove the hose casing, for example in an end region. On the other hand, it is thereby possible locally for the inner hose and the hose casing to move in relation to one another, such that in the event of, for example, a bending stress a certain decoupling of the tensile or compression forces acting between the hose casing and inner hose is achieved. The loading on the inner hose is thereby reduced.

In order to enable a good guidance of the connecting elements, the inner hose is usually made from a comparatively hard material, in particular polyamide. In contrast, the hose casing is made of a considerably softer and more elastic material. In the event of bending, the hose casing in comparison to the hard inner hose is thus in a position to readily absorb elongation and buckling without damage—as a result of its lower hardness and the improved elasticity associated with it.

The inner hose here expediently has a hardness which is more than 30% and preferably more than 50% higher than that of the hose casing. The hose casing has, for example, a Shore A hardness of 40 to 50, and the inner hose a Shore A hardness of about 70 to 80. The preferred material used for the hose casing is polyurethane.

The hose casing is expediently formed in general from a thermoplastic elastomer, in particular a polyurethane elastomer. On account of the elastomeric, that is to say elastic properties of the hose casing, the feed hose is automatically returned to an original position which is suitable for feeding the connecting elements following even great bending stress.

As already mentioned, it is of particular significance that the two components are unconnected by integral bonding. This is achieved preferably by a suitable material pairing or, in a preferred alternative or complement, also by an additional separating layer, preferably a bandaging formed for example by a non-woven material. On account of this measure, it is reliably ensured even in the event of coextrusion that the hose casing lies directly and in particular also in a form-fitting manner against the inner hose, but does not enter into an integral bond with said inner hose. The bandaging here is preferably a full bandaging, that is to say that the separating material, for example the (polyester) non-woven material, covers all regions of the inner hose.

In a preferred further development, the hose casing is removed at the end from the inner hose, such that an end section of the inner hose is formed as a plug-in coupling element for the connection to the processing unit. When in use, the revealed end section is thus plugged into the processing unit and thus defines a transfer point for the connecting elements from the feed hose into the actual processing unit.

The hose pack is usually held and guided on the apparatus, in particular on a robot arm of the industrial robot, by means of suitable guide elements. A holding element for strain relief for the feed hose is additionally provided in a complementary manner to these guide elements for the hose pack as such, said holding element gripping the feed hose on the hose casing in a clamping manner in individual locations. The holding element generally clamps the hose casing in the manner of a bracket. It is only on account of the configuration having the flexible hose casing that such a mounting of the feed hose in individual locations, in particular on an industrial robot, is enabled, without the risk of damage to the hard inner hose.

This holding element is preferably located in direct proximity of the revealed end piece and thus the plug-in coupling element. When a multi-axis industrial robot is used, the holding element is preferably fastened on a flange between a robot arm and a robotic hand, the robotic hand supporting the processing tool or forming said processing tool.

The interior cross section of the inner hose is generally adapted to the connecting elements to be processed. In many applications in which bolt-shaped elements having a head are processed, for example screws, rivets, etc., the inner casing thus accordingly has a T-shaped interior cross-sectional profile. The exterior cross section of the inner hose may also be T-shaped or also already round. The exterior cross section of the hose casing is preferably circular in order to ensure a suitable guidance within the hose pack.

As supply lines within the hose pack, preferably control lines, media hoses, such as for example pneumatic hoses, water hoses, etc., and electrical supply lines, for example an electrical line for a processing unit for welding, are provided. In an expedient further development, a length compensation unit having a return spring is further located on the apparatus, said length compensation unit providing an automatic compensation of the length of the hose pack in the event of a movement of the apparatus, in particular the robotic hand.

Summarizing, the feed hose is distinguished by the fact that the inner hose obtains a considerably improved kink protection on account of the "over-molding" (embedding) of the inner hose inside the hose casing. Even after being kinked, as caused by a movement of the robot or by being trapped, the feed hose—and thus also the inner hose—on account of the elastic hose casing springs back to a state which ensures a further trouble-free feed of the connecting elements.

A further particular advantage of the feed hose is to be seen in the potential for an easy integration into a conventional hose pack; in particular because the feed hose is manageable like a conventional cable or hose on account of the hose casing and can be guided in particular even under strain relief. Preferably, a clamping mounting of the feed hose is enabled here and provided in which the hose casing is deformed. No damage to the inner hose occurs in this case.

Such an integration into a hose pack was not possible to date in feed hoses which, depending on circumstances, were partly arranged in protective conduits, since a clamping fastening of the protective conduits with sufficient clamping force was not possible.

On account of the detachable arrangement of the hose casing on the inner hose, "stripping", for example in connecting regions, is also made possible. The hose casing therefore does not enter into an integral bond with the inner hose.

An exemplary embodiment of the invention will be described in more detail in the following with reference to the figures.

DESCRIPTION OF THE INVENTION

In the figures, parts with the same operational effect are provided with the same reference signs.

Figure 1:
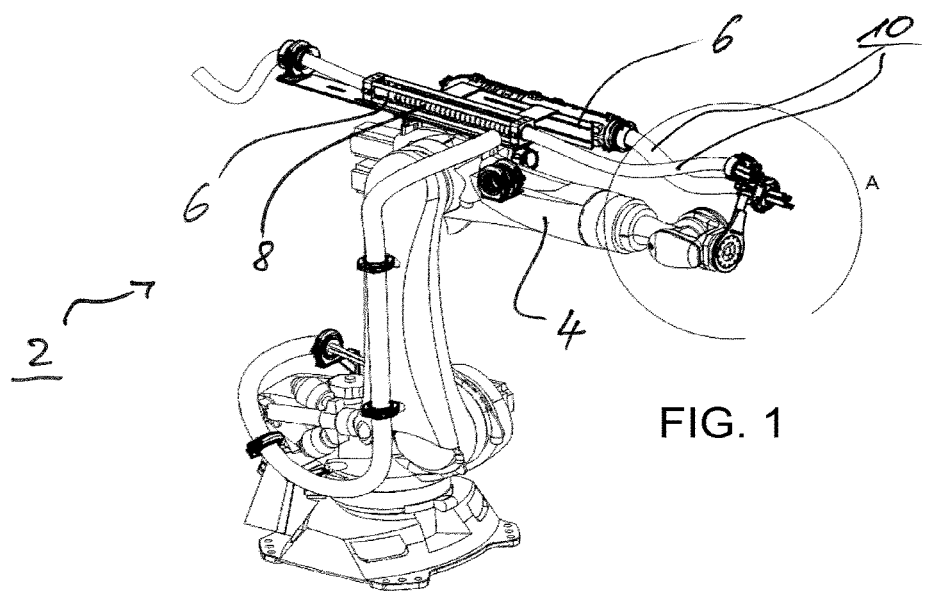
FIG. 1 shows a 6-axis industrial robot having a hose pack which is guided in a length compensation unit, a feed hose for connecting elements being located in said hose pack.

A multi-axis, in particular a 6-axis industrial robot is illustrated by way of example in FIG. 1 as an apparatus for the automated feed of connecting elements. The design and operation of such industrial robots 2 are known in principle. The industrial robot 2 comprises a robot arm 4 which is rotatably mounted about what is referred to as an axis-3, a flange 16 for the mounting of a processing unit/robotic hand (which is not shown in more detail here) being located at the end of said robot arm 4. A length compensation unit 6 having a return spring 8 is located in the region of the axis-3 on the upper side of the robot arm 4. Two such length compensation units 6, each for one hose pack 10, are provided in the exemplary embodiment. The hose packs 10 are each run in a suitable manner toward the processing unit.

The hose pack comprises a protective casing 12 which is formed, for example, as a corrugated tube or as an otherwise flexible plastic tube. A plurality of supply lines are laid within the protective casing, of which only two feed hoses 14 are illustrated per hose pack 10 in the exemplary embodiment.

In the exemplary embodiment, the hose packs 10 in each case fully run through the length compensation unit 6 and are surrounded within the length compensation units 6 by a coil spring, which bears on the one hand on the hose casing 12 and on the other hand on the length compensation unit 6, and which exerts a restoring force on the hose pack 10. In principle, it is also possible for the protective casing 12 to end within the length compensation unit 6 and for the individual supply lines to run individually, for example laterally, out from the length compensation unit 6.

Figure 2:
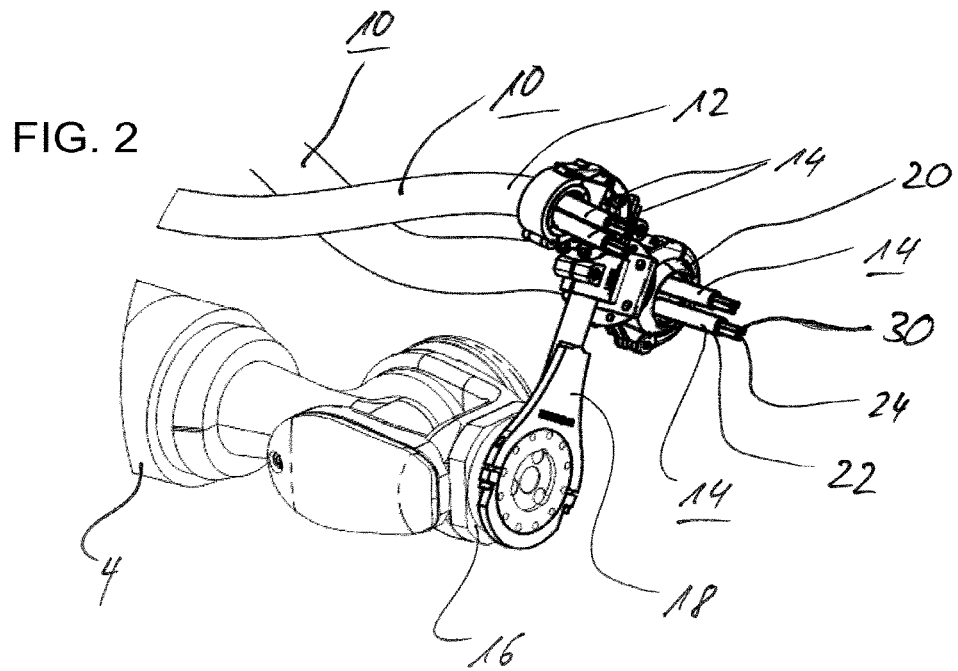
FIG. 2 shows a magnified illustration of the region identified in FIG. 1 by the circle A.

As is evident in particular in the magnified illustration shown in FIG. 2, a holding element 18 is fastened to the end of the flange 16, specifically on the surface on the end face of the coupling point toward the processing unit. At its free end, the holding element 18 has a clamping element 20, which is formed as a bracket and in which the feed hose 14 in each case is clamped individually for the purpose of strain relief. To this end, suitable inserts are provided within the clamping element 20 in the exemplary embodiment.

As is already evident in FIG. 2 and subsequently better evident in FIGS. 3A to 3C and 4A and 4B, the feed hose 14 is formed by an external hose casing 22 and an internal inner hose 24. According to the exemplary embodiment of FIGS. 4A and 4B, a separating layer 26 or separation is additionally provided in an alternative embodiment between the hose casing 22 and the inner hose 24. Said separating layer is in particular formed by an intermediate layer made, for example, from a (polyester) non-woven material.

The hose casing 22 is preferably "molded" onto the inner hose 24 by means of an extrusion process, such that said inner hose 24 is embedded inside the material of the hose casing 22.

Figure 3A:
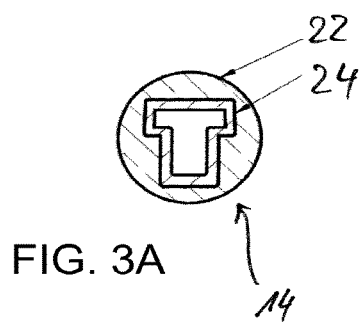
FIGS. 3A-3D show a first variant of an embodiment of the feed hose, FIG. 3A being a cross section according to line A-A of the side view as in FIG. 3B, FIG. 3C being a perspective illustration having a stripped end piece, and FIG. 3D being a magnified illustration of the end piece with a rivet located therein.
Figure 3B:
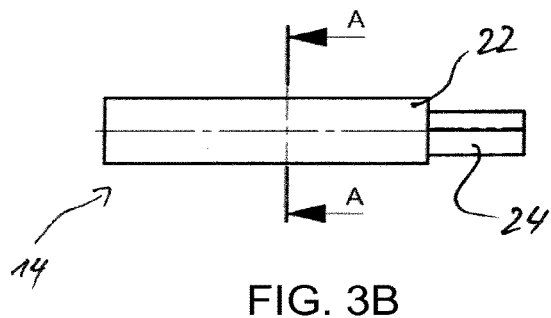
Figure 3C:
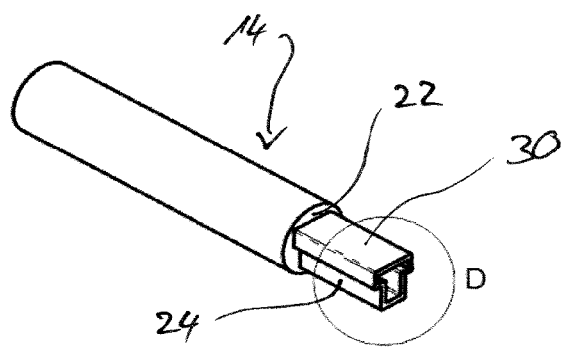
Figure 3D:
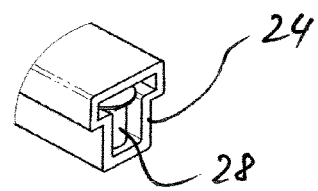

The materials of the hose casing 22 and the inner hose 24 are expediently different, in particular in terms of their hardness. The inner hose 24 is generally distinguished by a high hardness and stiffness, and is typically made of polyamide. The inner hose 24 usually has a Shore A hardness in the range of 70 to 80. It is suited as a sliding guidance for connecting elements. By way of example, a rivet is illustrated in FIG. 3D as a connecting element.

In contrast thereto, the hose casing 22 consists of a material of considerably lower hardness and in particular improved elasticity. The hose casing 22 preferably consists of a polyurethane. Its hardness lies preferably in the range of 40 to 50 Shore A. Alternatively, both the inner hose 24 and the hose casing 22 consist of polyurethane, but of different degrees of hardness. Particularly for this case, the separation formed as separating layer 26, in particular as a full bandaging of a non-woven material, is provided between the two components 22, 24.

In the exemplary embodiment of FIGS. 3A to 3D, the inner hose 24 has an overall T-shaped profile and is thus to this extent adapted to the geometry of the connecting element (rivet 28). Adapted interior cross section generally means that the connecting elements may be delivered, for example, by means of compressed air through the feed hose 14 even over large lengths of several 10 meters within the inner hose 24 in a predefined default position and default orientation. As can be seen in particular in the illustration of FIG. 3D, the connecting element in this case bears with its head on the lateral flanks of the T-shaped cross section of the inner hose 24.

In contrast to the inner hose 24, the hose casing 22 generally has a circular cross-sectional shape which is independent of the geometry of the inner hose 24.

Figure 4A:
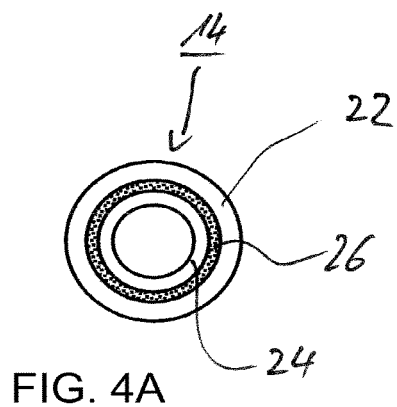
FIGS. 4A-4B show a second variant of the feed hose in a cross-sectional view (FIG. 4A) and in a side view (FIG. 4B).
Figure 4B:
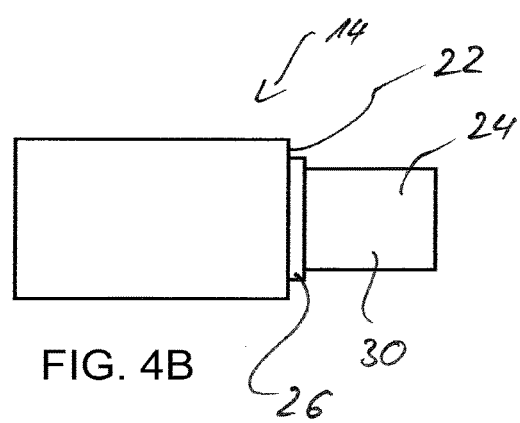

In the exemplary embodiment of FIGS. 4A and 4B, a variant of an embodiment having a circular inner hose 24 is illustrated. Here, the separating layer 26 formed by non-woven material is additionally evident.

Generally, the hose casing 22 is unconnected by integral bonding with the inner hose 24 and is thus easily removable from said inner hose 24. As may be gathered in particular from FIG. 2, this is exploited for the purpose of relieving the end of the feed hose of the hose casing 22 in order to thereby form a free end section of the inner hose 24, which serves as a plug-in coupling element 30 and is plugged into a corresponding coupling element on the processing unit.

The invention claimed is:

1. A feed hose for feeding connecting elements, the feed hose comprising:
   an inner hose permanently embedded in, and extending continuously through, a hose casing made from an elastic plastic from one end of said hose casing to an opposite end thereof when the feed hose is in use for feeding connecting elements, said inner hose having an interior cross section corresponding to a cross-sectional contour of the connecting elements, for a gliding guidance of the connecting elements, and
   wherein said inner hose and said hose casing are unconstrained relative to one another and disposed to move freely relative to one another; and
   wherein said hose casing is an extruded part extruded onto said inner hose substantially over an entire length thereof from the one end to the opposite end of said hose casing.

2. The apparatus according to claim 1, wherein said inner hose is made from a relatively harder material than said hose casing.

3. The apparatus according to claim 2, wherein said inner hose is made of a polyamide.

4. The apparatus as claimed in claim 2, wherein said hose casing is formed of a thermoplastic elastomer.

5. The apparatus according to claim 1, which comprises a separating layer disposed between said hose casing and said inner hose.

6. The apparatus according to claim 1, wherein said separating layer is a bandaging layer.

7. The apparatus according to claim 1, wherein said inner hose projects beyond the hose casing at an end thereof, and a projecting end section of said inner hose thus forms a plug-in coupling element for a connection to a processing unit.

8. The apparatus according to claim 1, wherein said inner hose has a polygonal interior cross-section.

9. The apparatus according to claim 8, wherein said inner hose has a T-shaped interior cross section.

10. The apparatus according to claim 8, wherein said inner hose has a Shore A hardness of about 70 to 80 and said outer hose has a Shore A hardness of about 40 to 50.

\* \* \* \* \*